Dec. 8, 1959 G. M. KREMBS 2,916,639

MAGNETIC TRANSDUCING DEVICE AND CIRCUIT THEREFOR

Filed Oct. 30, 1958

GEORGE M. KREMBS
*INVENTOR.*

BY Flehr and Swain
ATTORNEYS

United States Patent Office 2,916,639

Patented Dec. 8, 1959

2,916,639

MAGNETIC TRANSDUCING DEVICE AND CIRCUIT THEREFOR

George M. Krembs, Stanford, Calif., assignor to Ampex Corporation, Redwood City, Calif., a corporation of California Application October 30, 1958, Serial No. 770,677

7 Claims. (Cl. 307—88.5)

This invention relates to a magnetic record transducing device and circuit therefor.

It is a general object of the present invention to provide a semiconductive magnetic transducing device.

It is another object of the present invention to provide a semiconductive magnetic transducing device which employs modulation of carrier flow in a semiconductive lattice to convert magnetic fields into electrical signals.

It is another object of the present invention to provide a magnetic transducing device suitable for operation over a broad band of frequencies including zero frequency.

It is still a further object of the present invention to provide a semiconductive magnetic transducing device in which the upper frequency of operation is limited by the transit time of carriers in an intrinsic region.

These and other objects of the invention will become more clearly apparent from the following description when taken in conjunction with the accompanying drawing.

Referring to the drawing.

Figure 1:
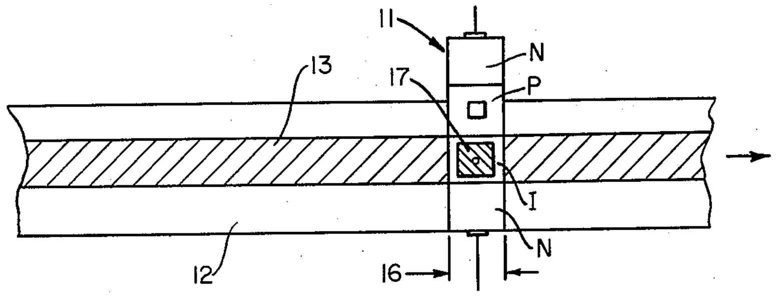
Figure 1 shows a transducing device in accordance with the invention.

Referring to Figure 1, the transducing device 11 is shown in cooperative relationship with magnetic recording medium 12, such as a magnetic tape, which has a record track 13. The transducing device comprises a four-layer semiconductive device including an intrinsic region. The device shown is an NPIN device. The intrinsic region is disposed adjacent the record track 13. The flux on the magnetic tape travels through the intrinsic region. As is well known, the gap width in conventional devices determines the upper frequency for which the device may be used. The "effective" gap width of the present transducer is the width 16 of the device.

Suitable ohmic contact is made to each of the various layers. Preferably large area ohmic contact 17 is formed on one surface of the intrinsic region. Terminal leads are attached to the contacts.

Figure 2:
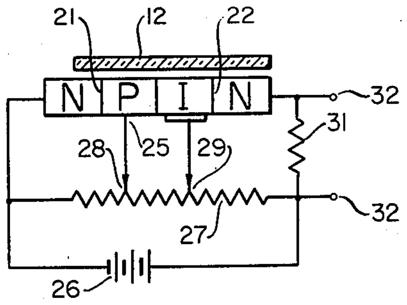
Figure 2 shows a transducing device connected in a circuit which applies suitable voltages.

In operation the terminal leads may be connected in an electrical circuit of the type illustrated in Figure 2. Forward bias is applied between the first N and P regions which form an emitter junction 21. The forward bias causes emission of electrons across the junction into the P layer. A large reverse bias is applied between the base terminal 25 and the collector terminal 32. This serves to sweep the emitted electrons out of the base regions P into the intrinsic region I.

As is well known, the intrinsic region contains substantially an equal number of electrons and holes that on the average no emitted electrons will be recombined in this region. In this region the carriers may be considered as free charges in a vacuum space.

By adjusting the potential across the junction 22, any portion of the emitted carriers may be absorbed by the large area ohmic contact 17. With no field from the magnetic tape travelling through the intrinsic region, the operating point is established. The carriers are divided between the large area contact 17 and the collector region N.

When a magnetic field is applied orthogonal to the direction of carrier flow, as might be obtained from a tape 12, a deflecting force is applied to the carriers deflecting them, depending upon the sense of the magnetic field, either toward or away from the large area ohmic contact.

The output current will vary about the zero field point value. A reverse biased junction has a high A.-C. output impedance. Thus, the output voltage is a useful signal.

The circuit illustrated provides means for applying suitable voltages to the various regions. A battery 26 is connected across the resistance 27 which serves as a voltage divider. The variable taps 28 and 29 provide suitable voltages to the P and I regions. The collector region is resistively connected by the load resistor 31 to the positive terminal of the voltage source 26. The output A.-C. signal is obtained across the resistor 31 and is available at the terminal 32.

Since the head senses flux rather than the rate of change of flux, it has a low frequency response down to zero frequency. The high frequency response is limited by the transient time of carriers in the intrinsic region, or if the field is stored on a tape by the gap width 16 of the transducing device.

Figure 3:
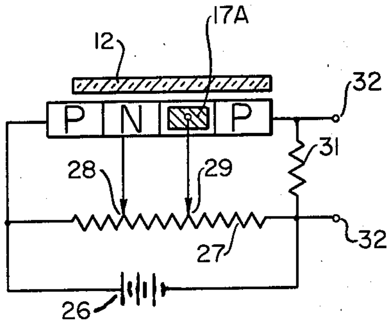
Figure 3 shows a transducing device which is sensitive to magnetic fields having perpendicular orientation.

The device described above is suitable for detecting longitudinal fields. By changing the position of the large area contact 17 to that indicated at 17A in Figure 3, the transducing device may be made sensitive to perpendicular components of magnetic field. The device shown in Figure 3 has the conductivity types reversed from those previously described to show that a head of either the PNIP type or NPIN type may be employed. In all other respects the circuit of Figure 3 operates as the circuit of Figures 1 and 2 although it is believed that the range of frequencies for which the device may be used may be narrower since the hole mobility is less.

Figure 4:
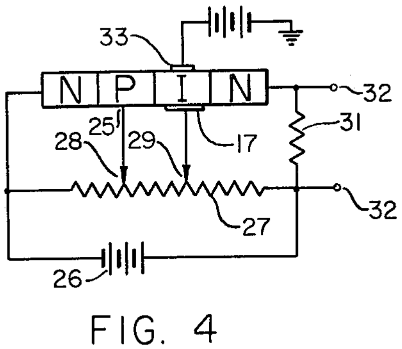
Figure 4 shows a transducing device which includes means for increasing the frequency response when employed to detect flux stored on a magnetic medium.

Referring to Figure 4, a means for reducing the "effective" gap width is illustrated. In the device of Figure 4, a second electrode 25, which may be a small area contact 33, is provided in the intrinsic region. A transverse electric field is applied across the intrinsic region. This field serves to effectively narrow the gap width.

Thus, it is seen that a transducing device is provided in which the magnetic field is the control element for current flow. The device is simple to construct and suitable for use over a relatively broad frequency range.

I claim:

1. A transducing device for converting magnetic flux into electrical signals comprising a body of semiconductive material which includes an intrinsic region through which the flux passes, means for injecting carriers into said region, said carriers being deflected by the magnetic flux passing therethrough, an ohmic contact formed on one surface of said intrinsic region serving to absorb carriers flowing thereto, and a collector serving to collect carriers flowing thereto, the proportion of carriers flowing from the intrinsic region to the ohmic contact and collector being dependent upon the strength and polarity of magnetic field.

2. A transducing device for converting magnetic flux into electrical signals comprising a body of semiconductive material having emitter, base, intrinsic and collector regions, said flux adapted to flow through the intrinsic region, means for injecting carriers into said base region, means for sweeping carriers from said base region into the intrinsic region, an ohmic contact formed on one surface of said intrinsic region serving to absorb carriers flowing thereto, and a collector serving to collect carriers flowing thereto, the proportion of carriers flowing to the ohmic contact and to the collector from the intrinsic region being dependent upon the strength and the polarity of the magnetic field.

3. Apparatus as in claim 2 wherein said ohmic contact is a large area contact.

4. A transducing system for converting magnetic flux into electrical signals comprising a body of semiconductive material which includes emitter, base, intransic and collector regions, means for applying a voltage between said emitter and base regions to cause injection of carriers into the base region, means for applying a voltage between the intrinsic region and the collector region of such magnitude that it biases the junction between said regions to sweep carriers from the base region into the intrinsic region, said device being disposed whereby the magnetic flux passes through the intrinsic region to deflect the carrier flowing therethrough, a large area ohmic contact formed on one surface of said intrinsic region serving to absorb carriers deflected thereto, said collector region serving to collect carriers flowing thereto, the proportion of carriers flowing to the ohmic contact and collector being dependent upon the strength and polarity of the magnetic field.

5. A transducing device for converting magnetic flux into electrical signals comprising a body of semiconductive material which includes an intrinsic region through which the flux passes, means for injecting carriers into said intrinsic regions, said carriers being deflected by the magnetic flux passing through the region, a large area ohmic contact formed on one surface of said intrinsic region serving to absorb carriers flowing thereto, an ohmic contact formed on the opposite surface of said region, means for applying a voltage between said contacts whereby a transvere field is set up in the intrinsic region, and a collector in contact with said intrinsic region serves to collect carriers flowing thereto, the proportion of carriers flowing to the large area ohmic contact and collector being dependent upon the strength and polarity of the magnetic field.

6. A transducing device for converting magnetic flux into an electrical signal comprising a substantially rectangular body of semiconductive material which includes an intrinsic region through which the flux passes, means for injecting carriers into said intrinsic region, said carriers being deflected by magnetic flux passing through the intrinsic region, an ohmic contact formed on one surface of said intrinsic region and serving to absorb carriers flowing thereto, said large area contact being disposed parallel to the longitudinal field passing through the intrinsic region, and a collector serving to collect carriers flowing thereto, the proportion of carriers flowing to the ohmic contact and collector being dependent upon the strength of the longitudinal magnetic field.

7. A transducing device for converting magnetic flux into an electrical signal comprising a body of semiconductive material which includes an intrinsic region through which the flux passes, means for injecting carriers into said region, said carriers being deflected by the magnetic flux passing through the intrinsic region, a large area ohmic contact formed on one surface of said intrinsic region serving to absorb carriers flowing thereto, said ohmic contact being disposed whereby its plane is parallel to the direction of travel of the magnetic field through the intrinsic region, and a collector serving to collect the carriers flowing thereto, the proportion of carriers flowing to the ohmic contact and to the collector being dependent upon the strength and the polarity of the vertical magnetic field flowing through the intrinsic region.

References Cited in the file of this patent

UNITED STATES PATENTS

| | | |
|---|---|---|
| 2,553,491 | Shockley | May 15, 1951 |
| 2,794,863 | Van Roosbroeck | June 4, 1957 |
| 2,869,084 | Shockley | Jan. 13, 1959 |